US012796859B2

(12) United States Patent
Xu

(10) Patent No.: US 12,796,859 B2
(45) Date of Patent: Nov. 17, 2026

(54) AUTOMATIC COOKING MACHINE AND CONTROL METHOD THEREFOR

(71) Applicant: FOODLEADER TECHNOLOGY (SHENZHEN) CO., LTD., Shenzhen (CN)

(72) Inventor: Fuhai Xu, Shenzhen (CN)

(73) Assignee: FOODLEADER TECHNOLOGY (SHENZHEN) CO., LTD., Shenzhen (CN)

( * ) Notice: Subject to any disclaimer, the term of this patent is extended or adjusted under 35 U.S.C. 154(b) by 447 days.

(21) Appl. No.: 18/282,843

(22) PCT Filed: Jul. 1, 2021

(86) PCT No.: PCT/CN2021/104084
§ 371 (c)(1),
(2) Date: Dec. 20, 2023

(87) PCT Pub. No.: WO2022/193476
PCT Pub. Date: Sep. 22, 2022

(65) Prior Publication Data

US 2024/0164575 A1 May 23, 2024

(30) Foreign Application Priority Data

Mar. 19, 2021 (CN) ......................... 202110296575.2
Mar. 19, 2021 (CN) ......................... 202120571562.7

(51) Int. Cl.
*A47J 39/00* (2006.01)
*A47J 36/32* (2006.01)
(Continued)

(52) U.S. Cl.
CPC ............... *A47J 36/32* (2013.01); *A47J 39/00* (2013.01); *F24C 15/006* (2013.01); *F24C 15/2007* (2013.01)

(58) Field of Classification Search
CPC ........... F24C 15/006; A47J 36/32; A47J 39/00
(Continued)

(56) References Cited

U.S. PATENT DOCUMENTS 5,818,014 A * 10/1998 Smith .................. H05B 6/6408 219/679
2006/0151488 A1 7/2006 Ruffing et al.

FOREIGN PATENT DOCUMENTS

CN 107049057 A 8/2017
CN 207936141 U 10/2018
(Continued)

OTHER PUBLICATIONS

International Search Report of PCT Patent Application No. PCT/CN2021/104084 issued on Dec. 17, 2021.
(Continued)

*Primary Examiner* — Gene O Crawford
*Assistant Examiner* — Ayodeji H Ojofeitimi

(57) ABSTRACT

An automatic cooking machine (1) and a control method therefor are provided. The automatic cooking machine (1) comprises a cabinet assembly (11), and a control module, an information acquisition module, and a multiple heating bins (2) provided on the cabinet assembly (11). The information acquisition module is configured to acquire cooking information of a meal box and transmit the cooking information to the control module; and the control module is configured to receive the cooking information and control the heating bins (2) to cook food in the meal box.

14 Claims, 7 Drawing Sheets

(51) Int. Cl.
*F24C 15/00* (2006.01)
*F24C 15/20* (2006.01)

(58) Field of Classification Search
USPC .................................................... 221/150 HC
See application file for complete search history.

(56) References Cited

FOREIGN PATENT DOCUMENTS

| | | | |
|---|---|---|---|
| CN | 208160545 | U | 11/2018 |
| CN | 110179314 | A | 8/2019 |
| CN | 211454712 | U | 9/2020 |
| CN | 211582580 | U | 9/2020 |
| CN | 112006511 | A | 12/2020 |
| CN | 112998531 | A | 6/2021 |
| CN | 215457376 | U | 1/2022 |
| GB | 2497326 | A | 6/2013 |
| KR | 20040067653 | A | 7/2004 |

OTHER PUBLICATIONS

Written Opinion of the International Searching Authority of PCT Patent Application No. PCT/CN2021/104084 issued on Dec. 17, 2021.

First office action of counterpart Chinese Patent Application No. 202110448364.6 issued on Mar. 14, 2025.

Rejection Decision of counterpart Chinese Patent Application No. 202110448364.6 issued on Jun. 17, 2025.

* cited by examiner

AUTOMATIC COOKING MACHINE AND CONTROL METHOD THEREFOR

TECHNICAL FIELD

The present disclosure relates to the technical field of food preparation, and in particular, to an automatic cooking machine and a control method therefor.

BACKGROUND

Modern people's lives are fast-paced and time is tight. Many people, especially office workers, have insufficient time to prepare lunchbox and choose to eat out, especially when having a lunch break. However, the time for the lunch break is relatively concentrated, and the resources of the restaurant are limited in crowded places; consequently, people often need to take a number and wait in line for a long time for dining.

Moreover, the number of stoves in restaurants is generally limited, and the cooking process is manually controlled by a cook. The food serving speed in the restaurant is determined by two key factors, namely the number of stoves and the number of cooks, which has a great limitation. The slow food serving speed aggravates the contradiction between the dining requirements and the meal supply capacity.

In addition, as modern people have an increasingly accelerated pace of life, their lifestyles tend to be more convenient and faster, so that people spend more time and energy on work and leisure. The emergence of various home appliances has made people's lives more convenient, and the development of modern life has put forward a new requirement for technology and products. The automatic cooking machine automatically cooks food according to people's wishes, which can meet the dining needs of a large number of people without relying on local restaurant resources, thus allowing people to solve the dining problem as soon as possible in limited time and to get more leisure and work time.

To complete the cooking process of food in cooperation with an automatic cooking machine, a heating bin suitable for the automatic cooking machine needs to be provided. The heating bin is required to have the characteristics of a simple structure and high efficiency. The simple structure of the heating bin is beneficial to cost reduction and large-scale popularization, and the high efficiency can better meet the dining requirements of a large number of people.

SUMMARY

For the defects in the prior art, the present disclosure provides an automatic cooking machine.

The automatic cooking machine includes a cabinet assembly, and a control module, an information acquisition module and a plurality of heating bins that are arranged on the cabinet assembly;

- the information acquisition module is configured to acquire cooking information of a meal box and transmit the cooking information to the control module; and
- the control module is configured to receive the cooking information and control the heating bins to cook food in the meal box.

According to a requirement of an actual condition, the cabinet assembly can be provided with a plurality of groups of heat generation cabinets, and the dietary requirements of multiple persons can be met at the same time. The food in the meal box is pre-configured and only needs to be heated before consumption, thus the procedure is simple, the operation is convenient, the time is saved, and the efficiency is improved.

Further, the cabinet assembly includes a control cabinet and at least one group of heat generation cabinets, the control module and the information acquisition module are arranged in the control cabinet, and the heating bin is arranged in the heat generation cabinet.

Further, the heat generation cabinet includes an opening, and the heating bin includes a door arranged at the opening, and a heat generation device, a driving device, an access control system and a bin body that are arranged inside the heat generation cabinet, where the bin body is configured to accommodate the meal box, the heat generation device is arranged on the bin body, the driving device is configured to rotate the bin body, and the access control system is configured to control opening and closing state of the door.

The driving device rotates the bin body, which facilitates even heating of the food in the meal box.

The access control system is closed after a user puts the meal box, and keeps a closed state in the cooking process so as to ensure the safety of the operation process. After the user inputs correct user information, the access control system is opened.

Further, the control cabinet includes a code scanning bin, a size of the code scanning bin is matched with that of the meal box so as to position the meal box, the information acquisition module includes a code scanning unit arranged on the code scanning bin, and the code scanning unit is configured to identify image information on the meal box.

The image information is at least one of one-dimensional code, two-dimensional code, and character information. The cooking information of the food in the meal box can be obtained by scanning.

Further, the heating bin includes: a housing assembly, a heating bin body, and a rotary driving assembly;

- the housing assembly is provided with a first cavity, and the heating bin body is rotatably arranged in the first cavity;
- the heating bin body is provided with a second cavity configured to accommodate a container pot, and the heating bin body is further provided with at least one group of heat generation assemblies; and the rotary driving assembly is connected to the heating bin body, so as to drive the heating bin body to turn over.

Further, the heating bin further includes a plurality of guide rollers, the guide rollers are rotatably arranged on the housing assembly, and the guide rollers are in rolling contact with an outer surface of the heating bin body.

The guide roller is arranged on the heating bin and functions as guiding and supporting when the heating bin rotates.

Further, the housing assembly includes a front panel, an upper cover and a lower cover, and the front panel, the upper cover and the lower cover enclose the first cavity;

- the heating bin body is of an integrated structure; or the heating bin body includes an upper fixed plate and a lower fixed plate, and the upper fixed plate and the lower fixed plate are connected together to enclose the second cavity.

Further, the heat generation assembly is arranged on at least one of the upper fixed plate or the lower fixed plate.

Further, the heating bin further includes a heat preservation assembly provided between the heating bin body and the housing assembly.

Further, the lower cover extends upwards to abut against the upper cover, and an upward extending portion of the lower cover corresponds to the front panel.

Further, the heating bin further includes a heat insulation assembly, and the heat insulation assembly includes a rotary heat insulation disc and a heat insulation pad;

the rotary heat insulation disc is arranged on one side of the front panel away from the first cavity; and the heat insulation pad is arranged on one side of an upward extending portion of the lower cover.

Further, the rotary driving assembly is arranged on an outer side of the housing assembly, and the rotary driving assembly includes a driving motor assembly, a synchronous pulley driving assembly, a bearing assembly and a transmission shaft, where the driving motor assembly is configured to drive the synchronous pulley driving assembly, the synchronous pulley driving assembly is sleeved on the transmission shaft, and the transmission shaft is rotatably arranged on the housing assembly through the bearing assembly.

Further, the heating bin further includes a door front panel and a door inner frame that are arranged on one side of the front panel away from the first cavity, the door inner frame is arranged between the door front panel and the front panel, and the door inner frame is configured to arrange the rotary heat insulation disc.

Further, the heating bin further includes an electromagnetic lock, where the electromagnetic lock is arranged on the housing assembly and the door front panel, and the electromagnetic lock is configured to lock or unlock the door front panel.

Further, a heat dissipation device is further included. The heat dissipation device includes a first heat dissipation assembly and a second heat dissipation assembly;

the first heat dissipation assembly includes at least one first heat dissipation fan arranged on the heat generation cabinet; and the second heat dissipation assembly includes a second heat dissipation fan and a heat dissipation air duct, where the second heat dissipation fan is arranged inside the heat generation cabinet; and the heat dissipation air duct is arranged between the second heat dissipation fan and the access control system, and is configured to transport air driven by the second heat dissipation fan to a periphery of the access control system to cool the access control system.

During the cooking process of the food, the heating bin is in a closed state, and dissipates redundant heat timely to avoid potential safety hazards such as spontaneous combustion caused by overheating.

The present disclosure further provides a control method for the automatic cooking machine.

The control method for the automatic cooking machine includes the following steps:

acquiring cooking information of the food in the meal box and sending the cooking information to the control module;

receiving, by the control module, the cooking information, collecting state information of the heating bin and matching the meal box with the heating bin; and controlling the heating bin to open, receiving the meal box in the heating bin, and making the food in the meal box cooked.

Further, the method for "acquiring cooking information of the food in the meal box and sending the cooking information to the control module" includes: placing the meal box in a code scanning bin; and scanning, by a scanning unit, image information on the meal box and sending the obtained image information to the control module.

Further, the method for "matching the meal box with the heating bin" includes: controlling the heating bin in an idle state to open; and counting the heating bins in a working state, and displaying a progress of the cooking process that is about to be completed recently on a display screen.

Further, after "the making the food in the meal box cooked", the control module receives a real-time cooking parameter and a progress parameter, verifies the real-time cooking parameter with the cooking information as a standard, sends an instruction of stopping cooking to the heat generation cabinet when the progress parameter indicates that the progress is completed, and sends an instruction to a warning device to make it issue a warning;

the cooking information is a heating temperature, a heating duration and number of rotations of the heating bin, and a heat dissipation duration of the heat dissipation device; and the real-time cooking parameter is an actual heating temperature, an actual heating duration and an actual number of rotations of the heating bin in the food cooking process, and a heat dissipation duration of the heat dissipation device.

The automatic cooking machine is beneficial to batch production, meets dietary requirements of multiple persons at the same time, improves the efficiency, and shortens the waiting time.

The present disclosure has at least the following beneficial effects.

The container pot is placed in the second cavity and is heated by the heating bin body, so that the cooking process is achieved. The heating bin body may be provided with a plurality of groups of heat generation assemblies, which can be selected in a specific heating process so as to achieve switching between high and low fire during the cooking process. The heating bin provided by the present disclosure has the characteristics of uniform heating, a simple structure, easy operation, and high efficiency.

Further, the guide rollers are in rolling contact with the housing assembly, in particular with the front panel, so as to function as guiding and supporting during rotation of the heating bin.

Further, in a case that the upper fixed plate and the lower fixed plate are both provided with heat generation assemblies, a choice of single-sided heating or double-sided heating can be achieved in the cooking process.

Further, the arrangement of the heat preservation assembly can improve energy utilization.

Further, the arrangement of the heat insulation assembly can not only prevent the heat from overflowing to scald operators, but also ensure the temperature of other devices and avoid safety issues such as spontaneous combustion due to overhigh temperature.

Further, the rotary driving assembly is configured to rotate the heating bin in the food cooking process, so that the food is heated and mixed uniformly.

Further, the structure and the position design of the door front panel and the door inner frame make the door of the heating bin hollow, which can prevent the door panel from overheating.

Further, the arrangement of the electromagnetic lock can provide reliable locking for the door and improve the safety when the equipment is used.

BRIEF DESCRIPTION OF DRAWINGS

To describe the technical solutions in embodiments of the present disclosure more clearly, the drawings needed to be used in the embodiments will be briefly introduced below. It should be understood that the accompanying drawings show only some embodiments of the present disclosure, and therefore should not be considered as a limitation on the scope. Those ordinary skilled in the art may still derive other related drawings from these accompanying drawings without creative efforts.

DETAILED DESCRIPTION OF EMBODIMENTS

Figure 1:
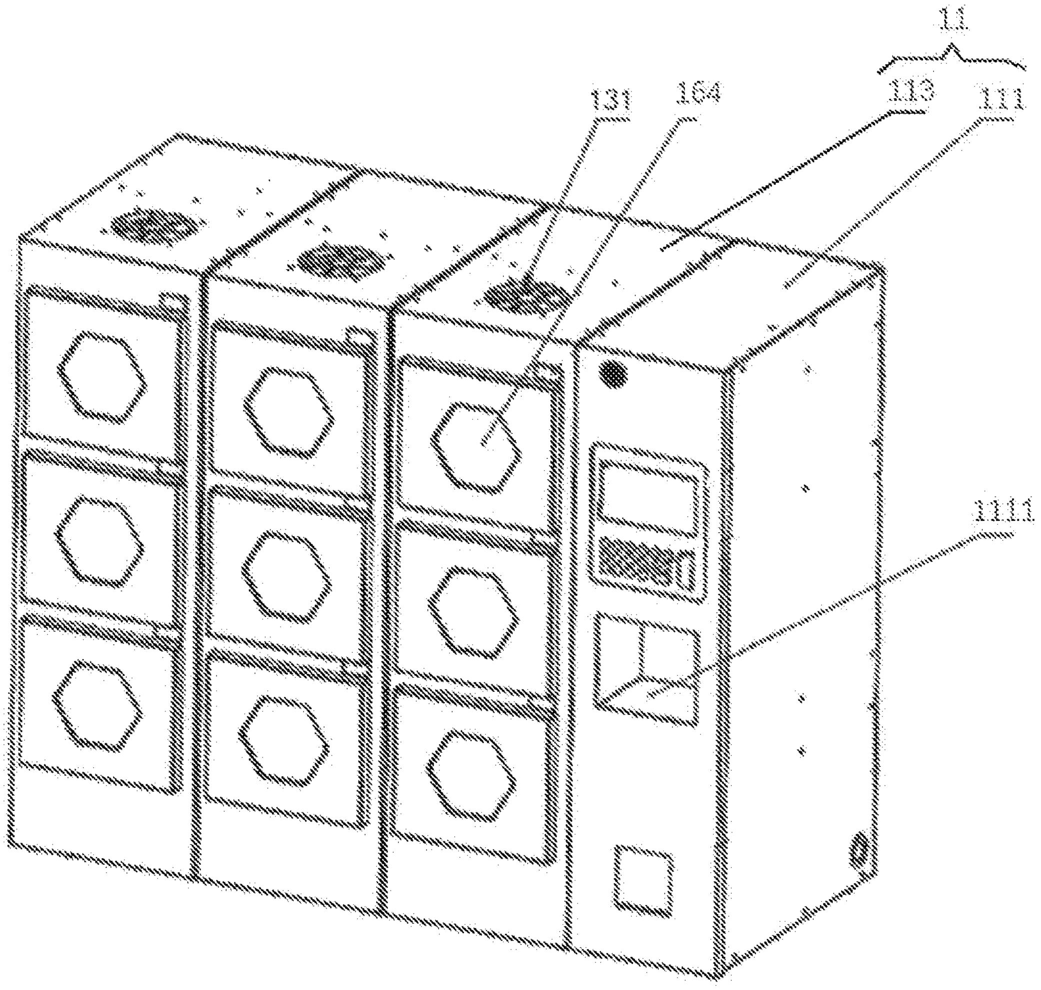
FIG. 1 is a schematic diagram of a structure of an automatic cooking machine provided by an embodiment of the present disclosure.
Figure 2:
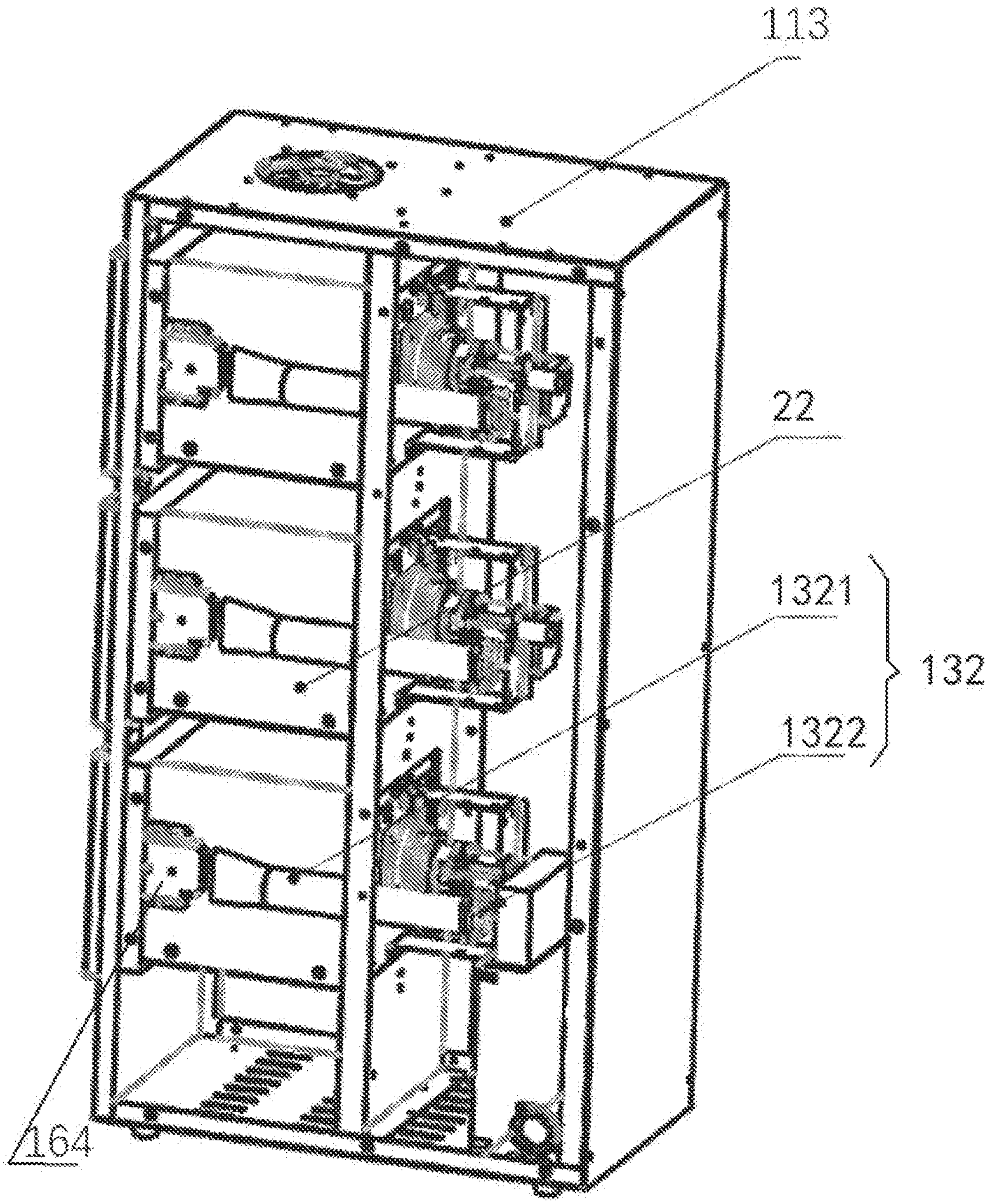
FIG. 2 is a schematic diagram of a structure of a heat generation cabinet of the automatic cooking machine shown in FIG. 1.
Figure 3:
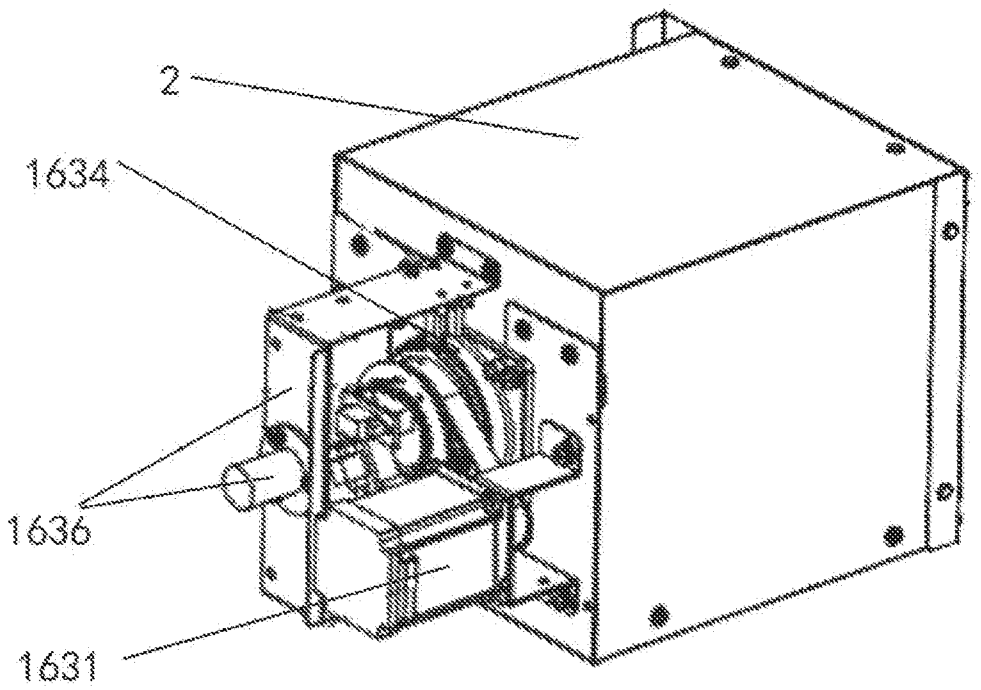
FIG. 3 is an exploded view I of a heating bin provided by an embodiment of the present disclosure.
Figure 4:
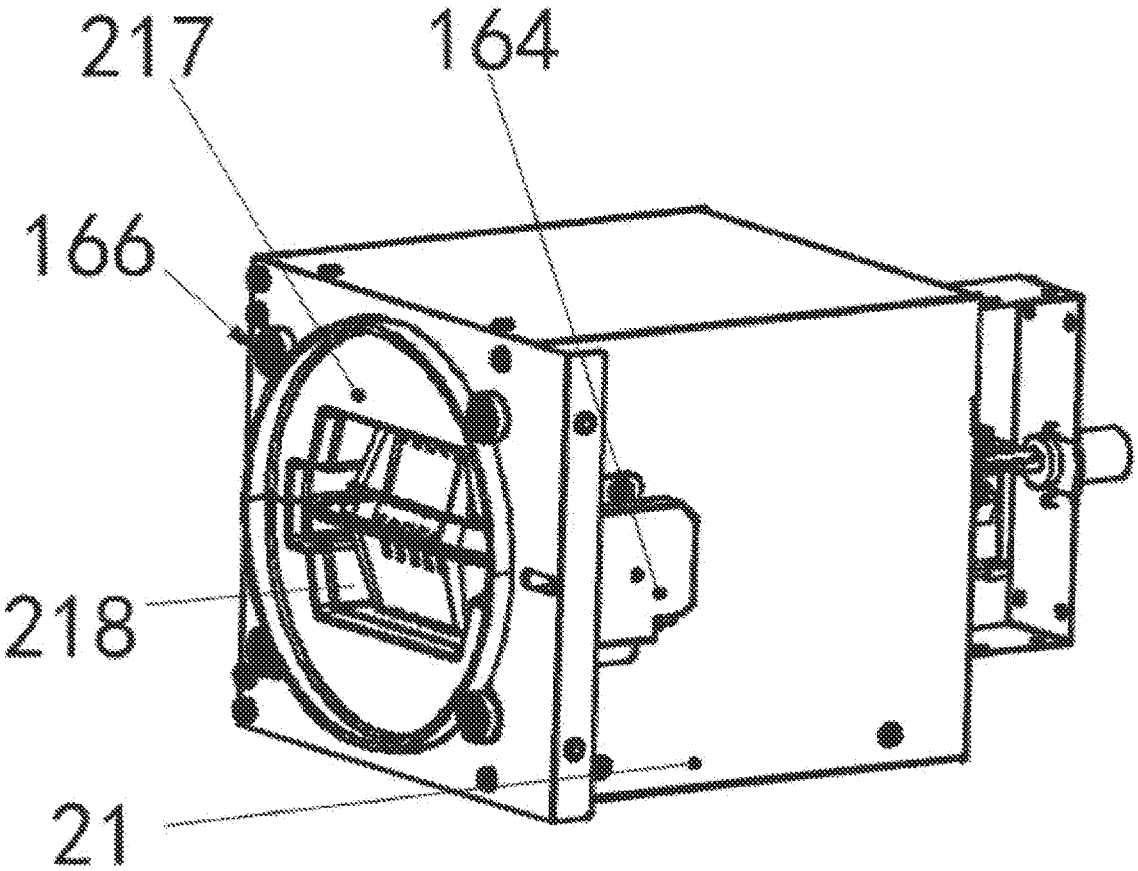
FIG. 4 is an exploded view II of a heating bin provided by to an embodiment of the present disclosure.
Figure 5:
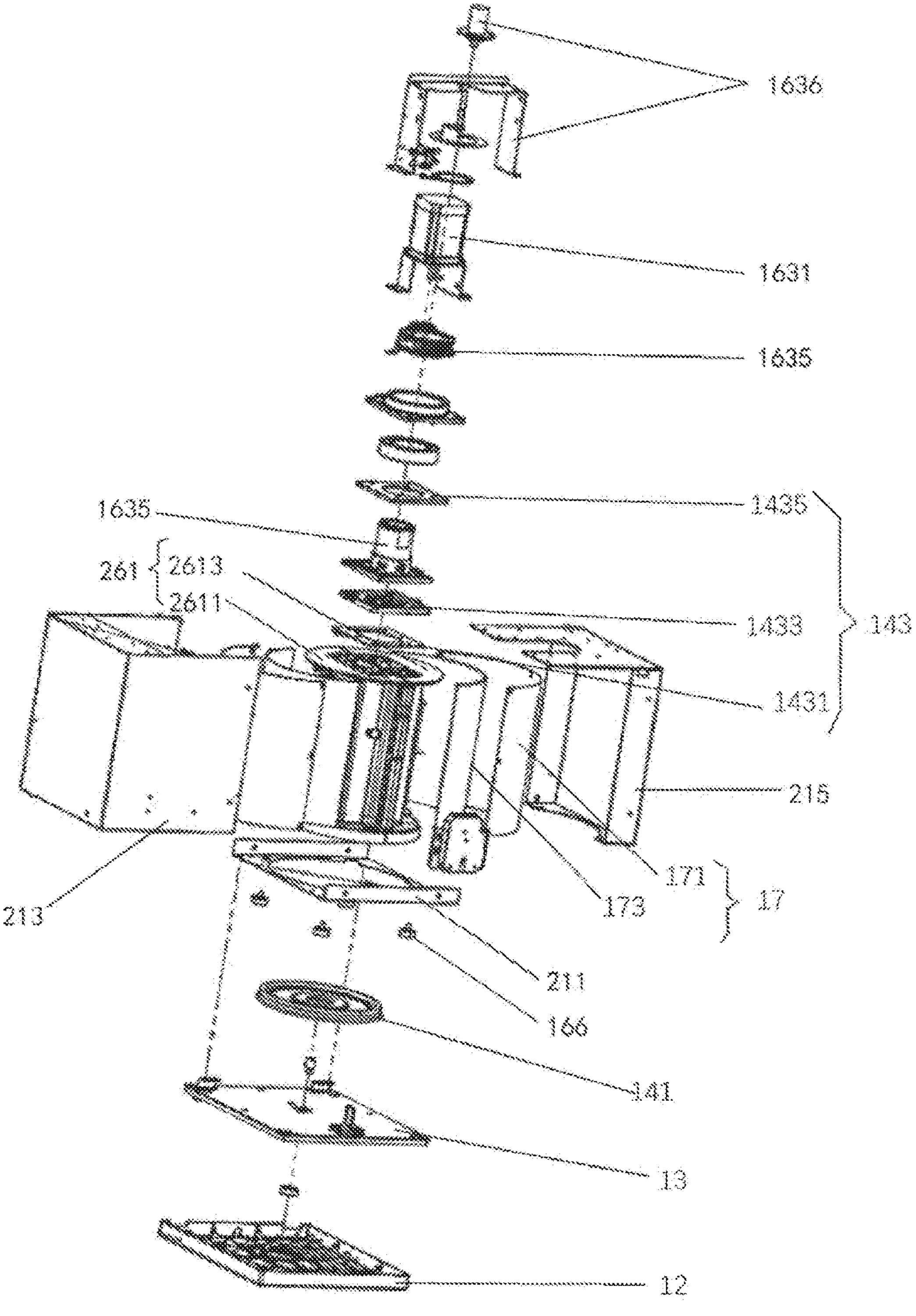
FIG. 5 is a schematic diagram of an exploded structure of the heating bin shown in FIG. 4.
Figure 6:
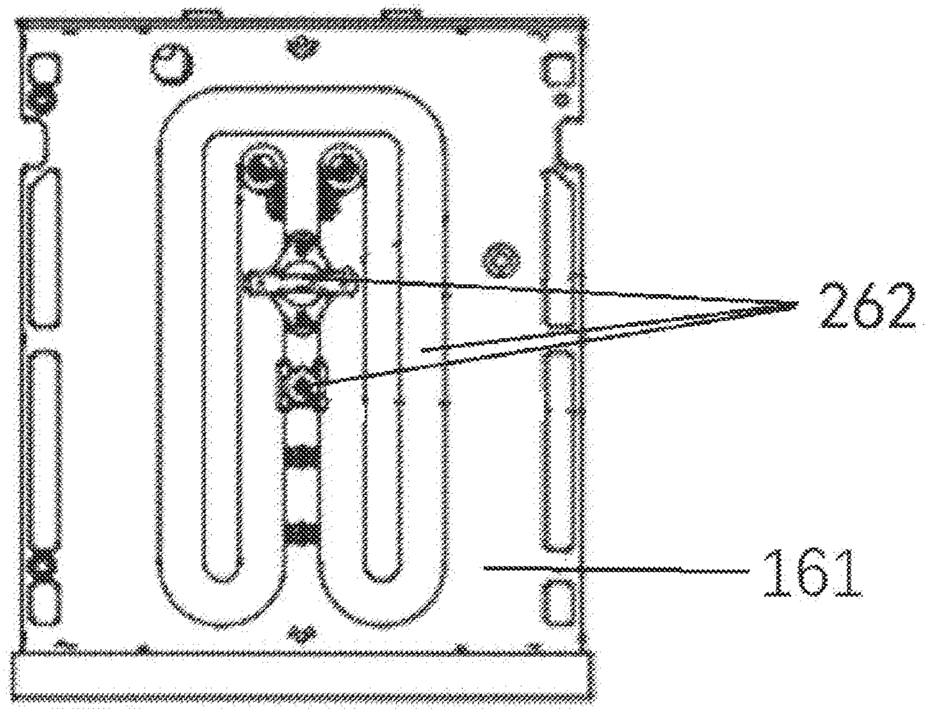
FIG. 6 is a schematic diagram of a structure of a heating assembly shown in FIG. 4.

Hereinafter, various embodiments of the present disclosure will be described more fully. The present disclosure may have various embodiments, and adjustments and changes may be made therein. However, it should be understood that there is no intention to limit the various embodiments of the present disclosure to the specific embodiments disclosed herein, but rather the present disclosure is to be understood to cover all modifications, equivalents, and/or alternatives falling within the spirit and scope of the various embodiments of the present disclosure.

At a centralized place and a centralized time point, the dining requirements of a large number of people cannot be guaranteed. People waiting for dinning often need to wait in line for a long time. The food serving speed in the restaurant is determined by two key factors, namely the number of stoves and the number of cooks, which has a great limitation. The slow food serving speed aggravates the contradiction between the dining requirements and the meal supply capacity.

To solve the above problems, the present disclosure provides an automatic cooking machine, which has a simple procedure, a simple operation, high efficiency and a flexible configuration according to situations, and can meet the dietary requirements of a large number of people.

As shown in FIGS. 1 to 6, the automatic cooking machine 1 includes a cabinet assembly 11, and a control module, an information acquisition module, a heat dissipation device and a plurality of heating bins 2 provided on the cabinet assembly 11.

The cabinet assembly 11 includes a control cabinet 111 and at least one group of heat generation cabinets 113. The control cabinet 111 includes a code scanning bin 1111, and the heat generation cabinet 113 includes an opening.

According to requirements of an actual condition, the cabinet assembly can be provided with a plurality of groups of heat generation cabinets, and the dietary requirements of multiple persons can be met at the same time. The food in the meal box is pre-configured and only needs to be heated before consumption, thus the procedure is simple, the operation is convenient, the time is saved, and the efficiency is improved.

The information acquisition module includes a code scanning unit arranged on the code scanning bin 1111.

The heating bin body includes: a housing assembly 21, a heating bin body 261, and a rotary driving assembly. The housing assembly 21 is provided with a first cavity 217, and the heating bin is rotatably arranged in the first cavity 217. The heating bin is provided with a second cavity 218 configured to accommodate a container 23, and the heating bin is further provided with at least one group of heat generation assemblies. The rotary driving assembly is connected to the heating bin to drive the heating bin to overturn.

Herein, the housing assembly 21 includes a front panel 211, an upper cover 213, a lower cover 215, and a first cavity 217 surrounded by the front panel, the upper cover, and the lower cover. The upper cover 213 extends downward, and a downward extending portion of the upper cover 213 is positioned at two sides of the front panel 211. The lower cover 215 extends upward to abut against the upper cover 213, an upward extending portion of the lower cover 215 corresponds to the front panel 211, and the upward extending portion of the lower cover 215 is formed with a through hole.

In this embodiment, the lower cover 215 extends upward to abut against the upper cover 213, and the upward extension portion of the lower cover 215 corresponds to the front panel 211.

According to an actual condition, the upper cover 213 and the lower cover 215 can also be arbitrarily extended on three sides except the one connected to the front panel 211, so as to achieve the purpose of forming the first cavity 217.

In this embodiment, the housing assembly 21 and the front panel 211 have a square appearance and can be set to other shapes based on requirements.

In this embodiment, a plurality of guide rollers 166 are included, the guide rollers 166 are rotatably arranged on the housing assembly 21, and the guide rollers 166 are in rolling contact with an outer surface of the heating bin. The guide roller 166 is arranged on one side of the front panel 211 far away from the first cavity 217. The guide rollers are in rolling contact with the front panel 211, and functions as guiding and supporting during rotation of the heating bin 2.

In this embodiment, the heating bin 261 has an integrated structure, and a second cavity is formed therein. Alternatively, the heating bin 261 includes an upper fixed plate 2611 and a lower fixed plate 2613, which are connected together to enclose the second cavity 218, and the second cavity 218 is configured to accommodate a container pot.

The upper fixed plate 2611 and the lower fixed plate 2613 include arc-shaped protrusions in a direction of a line connecting the front panel 211 and the upward extending portion of the lower cover 215 to prevent heat loss.

Both the upper fixed plate 2611 and the lower fixed plate 2613 may be provided with heat generation assemblies. Double-sided heating or single-sided heating can be achieved, or different heating efficiencies can be switched by choice.

Herein, at least one of the upper fixed plate 2611 and the lower fixed plate 2613 is provided with a heat generation assembly. The heat generation assembly includes a thermostat, a heat generation tube and a thermocouple.

The door front panel 12 and the door inner frame 13 are arranged on one side of the front panel 211 far away from the first cavity, and the door inner frame 13 is arranged between the door front panel 12 and the front panel 211. The door front panel 12 and the door inner frame 13 are square panels arranged in cooperation with the housing assembly 21.

The door front panel 12 is in a hollow structure to insulate the heat emitted by the housing assembly 21.

In this embodiment, the heat preservation assembly 17 is further included and is arranged between the heating bin body 261 and the housing assembly 21. The heat preservation assembly 17 includes a heat insulation cover 171 and heat preservation cotton 173. The heat preservation cotton 173 and the heat insulation cover 171 are sequentially arranged between the heat generation assembly 162 and the housing assembly 21 from inside to outside, so that the heat emitted by a heat generator is prevented from being lost greatly, and the energy utilization is improved. The heat preservation cotton 173 and the heat insulation cover 171 both surround the heating bin body 261 from the upper and lower sides, thus forming a cylindrical shape. The heat preservation cotton 173 and the heat insulation cover 171 may be formed in other shapes, however, the cylindrical shape is beneficial to saving heat preservation materials while ensuring the heat preservation function.

In this embodiment, a heat insulation assembly is further included, and the heat insulation assembly includes a rotary heat insulation disc 141 and a heat insulation pad 143. The rotary heat insulation disc 141 is a circular disc, which is arranged on one side of the front panel 211 away from the first cavity 217, and is arranged on the door inner frame 13 with a bearing, not rotating together with the heating bin 2 when the heating bin 2 rotates. The heat insulation pad 143 is arranged at one side of the upward extending portion of the lower cover 215. The heat insulation pad 143 includes a mica sheet 1431, a first heat insulation pad 1433, and a second heat insulation pad 1435.

Specifically, the rotary driving assembly is arranged at an outer side of the housing assembly 21, and the rotary driving assembly includes a driving motor assembly 1631, a synchronous pulley driving assembly 1634, a bearing assembly 1635 and a transmission shaft, where the driving motor assembly is configured to drive the synchronous pulley driving assembly, the synchronous pulley driving assembly is sleeved on the transmission shaft, and the transmission shaft is rotatably arranged on the housing assembly through the bearing assembly 21. Preferably, the rotary driving assembly includes a conductive slip ring assembly 1636, the conductive slip ring assembly 1636 includes a conductive slip ring and a conductive slip ring support, and the conductive slip ring is a transmission device for the driving motor assembly and a signal line. The driving motor assembly 1631 includes a driving motor and a support, and the driving motor provides a driving force for the rotation of the heating bin. The synchronous pulley driving assembly 1634 includes a synchronous belt and a synchronous wheel, and the synchronous wheel is in drive connection with the driving motor assembly through an engagement effect of the synchronous belt.

The bearing assembly 1635 includes a bearing and a bearing support, and the transmission shaft is arranged at the lower cover for providing a rotational driving force to the heating bin. A first heat insulation pad 1433 and a second heat insulation pad 1435 are arranged at two ends of the transmission shaft along a length direction of the transmission shaft for heat-insulating the transmission shaft and reducing an operating temperature of the conductive slip ring. The mica sheet 1431 and the first heat insulation pad 1433 are arranged between the heating bin body 261 and the upward extending portion of the lower cover 215. The transmission shaft passes through the second heat insulation pad 1435 and is in transmission connection with the bearing. The bearing support is arranged at the upward extending portion of the lower cover 215 to support the transmission shaft.

Specifically, a door front panel and a door inner frame are further included, which are arranged on one side of the front panel away from the first cavity, the door inner frame is arranged between the door front panel and the front panel, and the door inner frame is configured to arrange the rotary heat insulation disc.

Specifically, an electromagnetic lock is further included, which is arranged on the housing assembly 21 and the door front panel, and the electromagnetic lock is configured to lock or unlock the door front panel.

The heating bin is arranged in the first cavity 217, and includes a heating bin and at least one group of heat generation assemblies 262 arranged on the heating bin.

A plurality of groups of heat generation assemblies 262 can be arranged on the heating bin body 161, and by selecting the number of the groups of the heat generation assemblies 262, switching between high and low fire for cooking can be achieved, so as to meet different cooking requirements or cooking efficiency requirements.

The thermostat functions as thermal protecting for the heating bin body 161, the heat generation tube is a heat generation unit, and the thermocouple is a temperature measuring unit.

The heat dissipation device includes a first heat dissipation assembly and a second heat dissipation assembly 132. The first heat dissipation assembly includes a first heat dissipation fan, and the second heat dissipation assembly 132 includes a second heat dissipation fan 1322 and a heat dissipation air duct 1321.

At least one first heat dissipation fan is arranged on the heat generation cabinet 113, and the hot air in the heat generation cabinet 113 is discharged through the first heat dissipation fan.

The second heat dissipation fan 1322 is arranged inside the heat generation cabinet 113, and the heat dissipation air duct 1321 is arranged between the second heat dissipation fan 1322 and the access control system 164, and is configured to transport air driven by the second heat dissipation fan 1531 to a periphery of the access control system 164 to cool the access control system 164.

The control module is arranged in the control cabinet 111, and is configured to receive the cooking information and control the heating bin 2 to make the food in the meal box cooked.

The cooking information includes a heating temperature, a heating duration and the number of rotations of the heating bin, and a heat dissipation duration of the heat dissipation device.

The information acquisition module is arranged in the control cabinet 111, and is configured to acquire cooking information of a meal box and transmit the cooking information to the control module.

When the heating bin 2 makes the food cooked, the access control system 164 is in a closed state, and the heat generation cabinet 113 is in a closed environment; therefore, the dissipating the redundant heat timely can avoid potential safety hazards such as spontaneous combustion caused by overheating.

The driving device rotates the heating bin body, which is beneficial to even heating of the food in the meal box. The driving device includes a motor, a synchronous belt, a synchronous wheel, a rotary bearing assembly 1635, and a conductive slip ring 166.

The heating bin 22 rotates through the rotation of a rotating shaft, and the synchronous wheel is arranged on the rotating shaft. The motor 1631 rotates the synchronous wheel through an engagement effect of the synchronous belt, thereby implementing rotation of the heating bin 22.

The rotary bearing assembly 1635 includes a fixing seat and a bearing, the bearing is arranged on an inner side of the fixing seat, an outer side of the fixing seat is arranged at the heat generation cabinet 113, and is configured to support the bearing and the rotating shaft of the heating bin 22, and the bearing is configured to reduce the resistance of the rotating shaft to rotate.

The access control system 164 is arranged at the opening, and is closed after a user puts the meal box, keeping a closed state in the cooking process, so as to ensure the safety of the operation process. The access control system 164 opens after the user inputs correct user information.

The guide rollers 166 are in rolling contact with the heating bin 22, which functions as guiding and supporting during rotation of the heating bin 22.

The size of the code scanning bin 1111 is matched with that of the meal box to position the meal box, so that when the meal box is in the code scanning bin 1111, the code scanning unit obtains image information on the meal box.

The image information is at least one of one-dimensional code, two-dimensional code, and text information. The cooking information of the food in the meal box can be obtained by scanning.

In this embodiment, an input keyboard may be further arranged on the control cabinet, and the information may be manually input or obtained by selection.

In this embodiment, the control cabinet can also be provided with a display screen, a speaker, and a warning light, and the heat generation cabinet is provided with an origin switch. The display screen is configured to display the using state of the automatic cooking machine. The speaker and the warning light functions as warning after the food in the meal box is cooked. The origin switch is configured to detect the number of rotations of the heating bin and transmit this information to the control module to monitor the cooking progress of the food.

In this embodiment, an oil smoke exhausting device is provided to exhaust oil smoke in the heating bin out of the heat generation cabinet, so that potential safety hazards caused by oil smoke enrichment are avoided, and meanwhile the clean of the environment in the heating bin and the heat generation cabinet is guaranteed.

This embodiment provides a control method for the automatic cooking machine.

Figure 7:
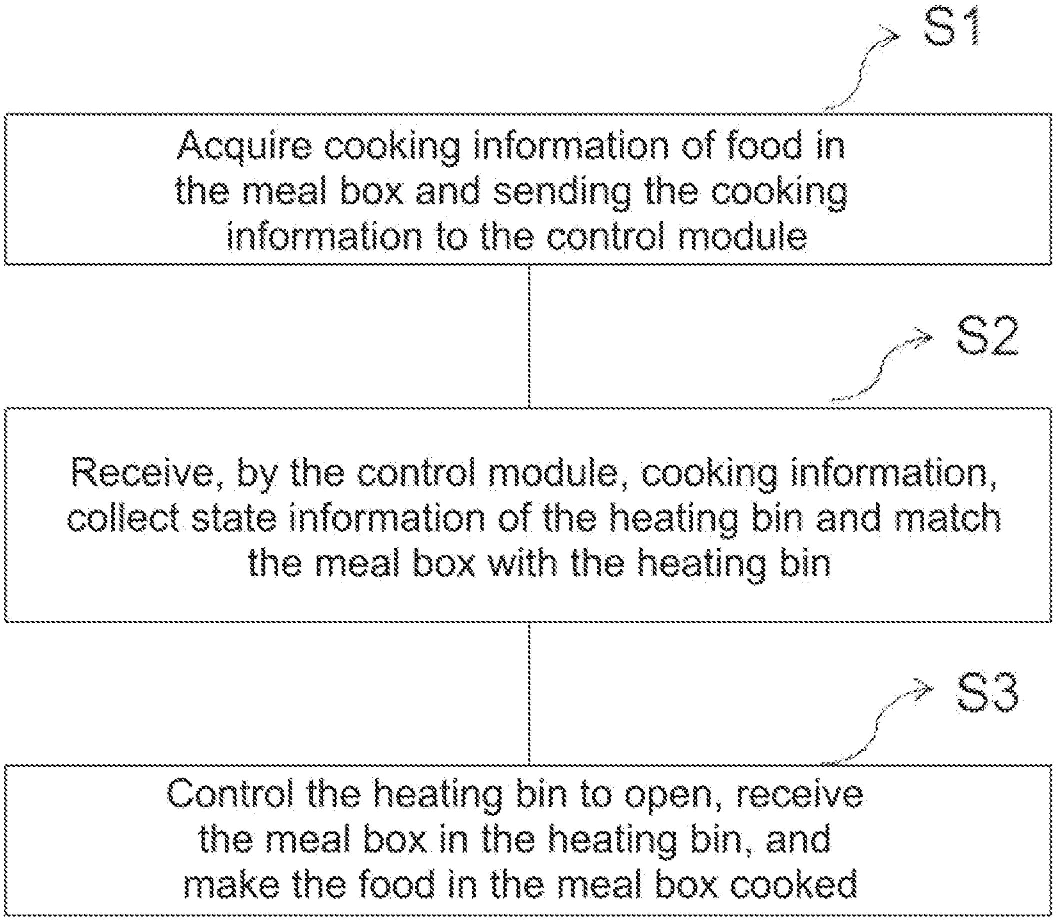
FIG. 7 is a flowchart of a control method for the automatic cooking machine provided by an embodiment of the present disclosure.

Referring to FIG. 7, FIG. 7 is a flowchart of a control method for the automatic cooking machine provided by an embodiment of the present disclosure.

The control method for the automatic cooking machine includes the following steps:

S1: acquiring cooking information of food in the meal box and sending the cooking information to the control module.

The method for "acquiring cooking information of food in the meal box and sending the cooking information to the control module" includes: placing the meal box in a code scanning bin; and scanning image information on the meal box and sending the obtained image information to the control module by a scanning unit.

S2: receiving, by the control module, the cooking information, collecting state information of the heating bin and matching the meal box with the heating bin.

The method for "matching the meal box with the heating bin" includes: controlling the heating bin in an idle state to open; and counting the heating bins in a working state, and displaying a progress of the cooking process that is about to be completed recently on a display screen.

S3: controlling the heating bin to open, receiving the meal box in the heating bin, and making the food in the meal box cooked.

After "making the food in the meal box cooked", the control module receives a real-time cooking parameter and a progress parameter, verifies the real-time cooking parameter with the cooking information as a standard, sends an instruction of stopping cooking to the heat generation cabinet when the progress parameter indicates that the progress is completed, and sends an instruction to a warning device to make it issue a warning;

the cooking information is a heating temperature, a heating duration, the number of rotations of the heating bin, and a heat dissipation duration of the heat dissipation device; and the real-time cooking parameter is an actual heating temperature, an actual heating duration and an actual number of rotations of the heating bin in a food cooking process, and the heat dissipation duration of the heat dissipation device.

The automatic cooking machine is beneficial to batch production, meets dietary requirements of multiple persons, improves the efficiency, and shortens the waiting time. In addition, batch production can reduce costs and enrich the variety of dishes.

Those skilled in the art can understand that the accompanying drawings are merely schematic diagrams of a preferred implementation scenario and that the devices or processes shown in the accompanying drawings are not necessary to implement the present disclosure.

Those skilled in the art can understand that the apparatus in the devices in the implementation scenario may be distributed in the devices in the implementation scenario according to the description of the implementation scenario, and may also be positioned in one or more devices different from this implementation scenario with corresponding changes. The devices in the above implementation scenarios can be combined into one device, or can be further divided into a plurality of sub-devices.

The above serial numbers of the present disclosure are only for description and do not represent the advantages and disadvantages of the implementation scenarios.

The above disclosure is only a few specific implementation scenarios of the present disclosure; however, the present disclosure is not limited thereto. Any changes that can be thought of by those skilled in the art should fall within the protection scope of the present disclosure.

What is claimed is:

1. An automatic cooking machine, comprising: a cabinet assembly; and a control module, an information acquisition module and a plurality of heating bins which are arranged on the cabinet assembly, wherein the information acquisition module is configured to acquire cooking information of a meal box and transmit the cooking information to the control module; and the control module is configured to receive the cooking information and control the heating bins to make food in the meal box cooked, wherein the cabinet assembly comprises a control cabinet and at least one group of heat generation cabinets, the control module and the information acquisition module are arranged in the control cabinet, and the heating bin is arranged in the heat generation cabinet, wherein the heat generation cabinet comprises an opening, and the heating bin comprises a door arranged at the opening, and a heat generation device, a driving device, an access control system and a bin body that are arranged inside the heat generation cabinet, wherein the bin body is configured to accommodate the meal box, the heat generation device is arranged on the bin body, the driving device is configured to rotate the bin body, and the access control system is configured to control opening and closing state of the door.

2. The automatic cooking machine according to claim 1, further comprising a heat dissipation device, wherein the heat dissipation device comprises a first heat dissipation assembly and a second heat dissipation assembly;

the first heat dissipation assembly comprises at least one first heat dissipation fan arranged on the heat generation cabinet; and the second heat dissipation assembly comprises a second heat dissipation fan and a heat dissipation air duct, wherein the second heat dissipation fan is arranged inside the heat generation cabinet; and the heat dissipation air duct is arranged between the second heat dissipation fan and the access control system, and is configured to transport air driven by the second heat dissipation fan to a periphery of the access control system to cool the access control system.

3. The automatic cooking machine according to claim 1, wherein the control cabinet comprises a code scanning bin, a size of the code scanning bin is matched with that of the meal box so as to position the meal box, the information acquisition module comprises a code scanning unit arranged on the code scanning bin, and the code scanning unit is configured to identify image information on the meal box.

4. The automatic cooking machine according to claim 1, wherein the heating bin comprises: a housing assembly, a heating bin body, and a rotary driving assembly, wherein the housing assembly is provided with a first cavity, and the heating bin body is rotatably arranged in the first cavity;

the heating bin body is provided with a second cavity configured to accommodate a container pot, and the heating bin body is further provided with at least one group of heat generation assemblies; and the rotary driving assembly is connected to the heating bin body, so as to drive the heating bin body to turn over.

5. The automatic cooking machine according to claim 4, wherein the heating bin further comprises a plurality of guide rollers, the guide rollers are rotatably arranged on the housing assembly, and the guide rollers are in rolling contact with an outer surface of the heating bin body.

6. The automatic cooking machine according to claim 4, wherein the housing assembly comprises a front panel, an upper cover and a lower cover, and the front panel, the upper cover and the lower cover enclose the first cavity;

the heating bin body is of an integrated structure; or the heating bin body comprises an upper fixed plate and a lower fixed plate, and the upper fixed plate and the lower fixed plate are connected together to enclose the second cavity.

7. The automatic cooking machine according to claim 6, wherein the heat generation assembly is arranged on at least one of the upper fixed plate or the lower fixed plate.

8. The automatic cooking machine according to claim 4, wherein the heating bin further comprises a heat preservation assembly provided between the heating bin body and the housing assembly.

9. The automatic cooking machine according to claim 6, wherein the lower cover extends upward to abut against the upper cover, and an upward extending portion of the lower cover corresponds to the front panel.

10. The automatic cooking machine according to claim 6, wherein the heating bin further comprises a heat insulation assembly, and the heat insulation assembly comprises a rotary heat insulation disc and a heat insulation pad;

the rotary heat insulation disc is arranged on one side of the front panel away from the first cavity; and the heat insulation pad is arranged on one side of an upward extending portion of the lower cover.

11. The automatic cooking machine according to claim 4, wherein the rotary driving assembly is arranged on an outer side of the housing assembly, and the rotary driving assembly comprises a driving motor assembly, a synchronous pulley driving assembly, a bearing assembly and a transmission shaft, wherein the driving motor assembly is configured to drive the synchronous pulley driving assembly, the synchronous pulley driving assembly is sleeved on the transmission shaft, and the transmission shaft is rotatably arranged on the housing assembly through the bearing assembly.

12. The automatic cooking machine according to claim 10, wherein the heating bin further comprises a door front panel and a door inner frame which are arranged on one side of the front panel away from the first cavity, the door inner frame is arranged between the door front panel and the front panel, and the door inner frame is configured to arrange the rotary heat insulation disc.

13. The automatic cooking machine according to claim 12, wherein the heating bin further comprises an electromagnetic lock, the electromagnetic lock is arranged on the housing assembly and the door front panel, and the electromagnetic lock is configured to lock or unlock the door front panel.

14. An automatic cooking machine, comprising: a cabinet assembly; and a control module, an information acquisition module and a plurality of heating bins which are arranged on the cabinet assembly, wherein the information acquisition module is configured to acquire cooking information of a meal box and transmit the cooking information to the control module; and the control module is configured to receive the cooking information and control the heating bins to make food in the meal box cooked, wherein the heating bin comprises: a housing assembly, a heating bin body, and a rotary driving assembly, wherein the housing assembly is provided with a first cavity, and the heating bin body is rotatably arranged in the first cavity;

the heating bin body is provided with a second cavity configured to accommodate a container pot, and the heating bin body is further provided with at least one group of heat generation assemblies; and the rotary driving assembly is connected to the heating bin body, so as to drive the heating bin body to turn over.

* * * * *